July 3, 1956 F. A. STRAWSINE 2,752,843
WALL MOUNTED VENTILATOR
Filed June 23, 1954 2 Sheets-Sheet 2
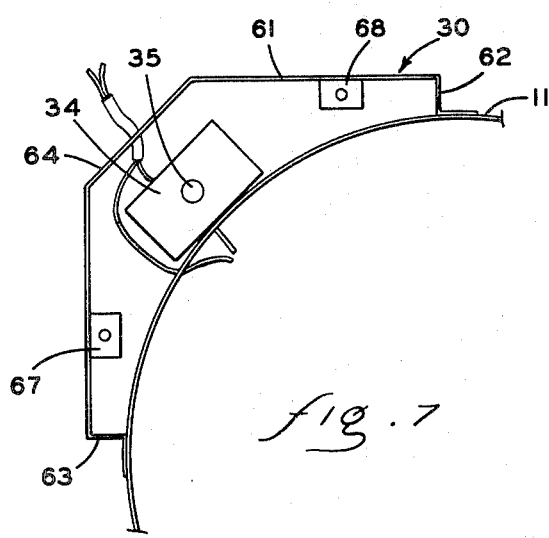
fig. 7
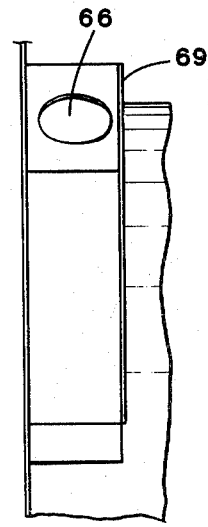
fig. 8
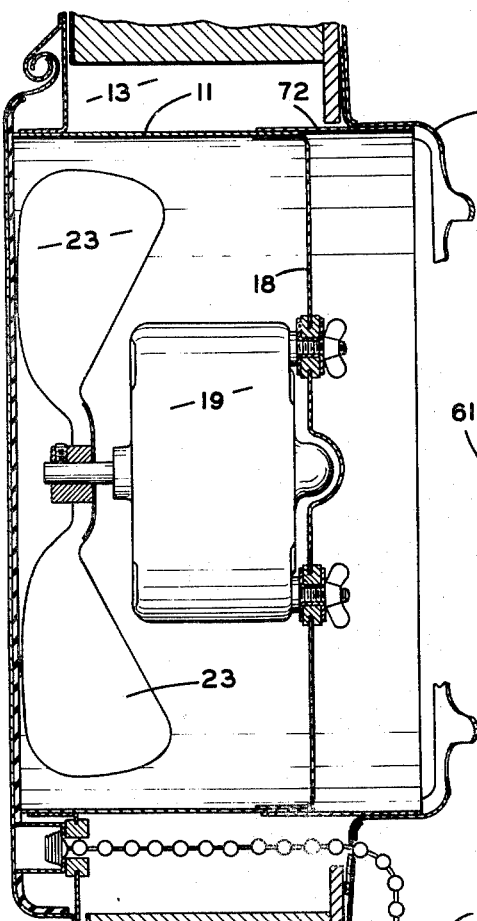
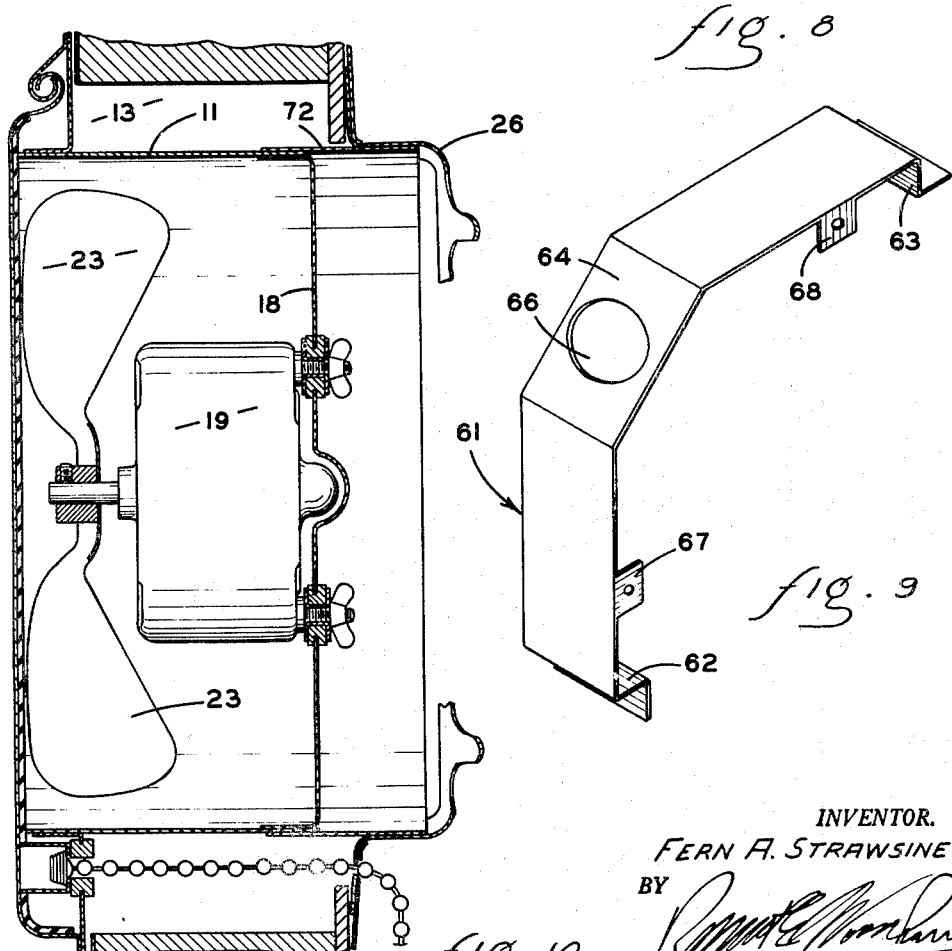
fig. 9
fig. 10
INVENTOR.
FERN A. STRAWSINE
BY
ATTORNEY United States Patent Office 2,752,843
Patented July 3, 1956

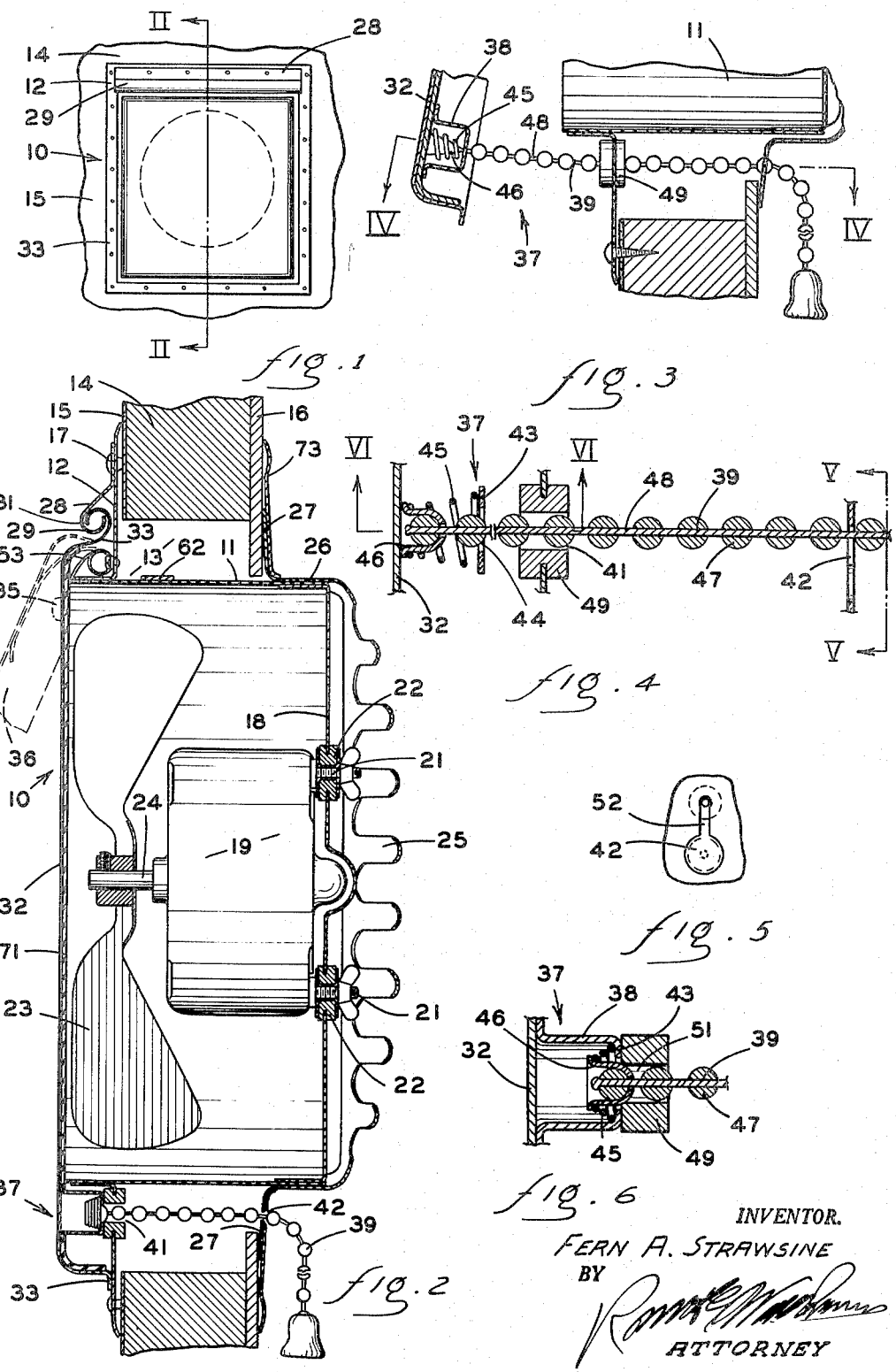

2,752,843

WALL MOUNTED VENTILATOR

Fern A. Strawsine, Corunna, Mich., assignor to Strawsine Manufacturing Co.

Application June 23, 1954, Serial No. 438,697

10 Claims. (Cl. 98—116)

This invention relates in general to a wall mounted ventilator and more particularly to a device for mounting an axial flow fan within an opening in the relatively thin wall of a trailer coach and for effectively weather sealing said opening when said fan is not in operation and said coach is moving.

The installation of wall mounted ventilators in trailer coaches gives rise to a number of unique problems not encountered in the conventional building application. Paramount among these are: (1) the walls of the coach are much thinner than building walls whereas the axial length of the ventilator unit remains about the same; (2) it is preferred to mount the ventilator unit on the outer panel of the trailer wall in order that, by carrying the weight of the unit on the outer panel, only a small grill will be needed on the inside wall of the trailer coach and this will provide a better interior appearance than if a large, load carrying, fixture were used inside; and (3) a secure, but easily releasable, closure mechanism must be provided to weather seal the ventilator opening when the coach is being moved through rain, dust or similar weather conditions, often at a rate of speed substantially exceeding the wind velocities normally acting on a stationary building. A conventional closure mechanism, as used with a wall ventilator for a stationary building is likely to leak prohibitively when applied to a trailer coach. The mounting of ventilators in stationary buildings is also materially different since such ventilators are mounted and supported substantially upon the frame of the wall itself rather than upon any particular panel of the wall. Further, a loose fitting cover will rattle when the coach is being moved thereby increasing wear and noise.

In spite of the above problems, some type of forced draft ventilator is as essential to trailer coaches as it is to any other inhabited space, if not more so.

Accordingly, the primary object of my invention is the provision of a mounting device for wall type ventilators, particularly applicable to a trailer coach, which eliminates or minimizes the said problems and others related thereto.

A further object of the invention is the provision of a device, as aforesaid, whereby the weight of the ventilator is supported primarily or entirely upon the external panel of the coach wall, which is normally the stronger portion of the wall.

A further object of this invention is the provision of a device, as aforesaid, whereby the means supporting the ventilator upon the external panel also supports a weather sealing cover for the opening in the coach wall in which the ventilating unit is installed.

A further object of this invention is the provision of a locking mechanism whereby said cover may be positively, but easily releasably, held in weather sealing position when the ventilator is not in use.

A further object of this invention is the provision of a ventilator, as aforesaid, whereby a ventilator unit built for trailer use can, by a minor modification, be used in a house, and to provide such a modification.

A further object of the invention is the provision of a device, as aforesaid, wherein the switch box is formed as a part of a ventilator construction and the switch is positioned therein in such a manner that it is operated as desired by the ventilator cover.

Other objects and purposes of this invention will become apparent to persons familiar with this type of equipment upon reading the following specification and examining the accompanying drawings in which:

Figure 1 is an outside view of my ventilator and mounting device therefor.

Figure 2 is a sectional view taken along the line II—II of Figure 1 disclosing my mounting device with an axial flow fan and motor supported therein.

Figure 3 is a fragmentary showing of the lower portion of Figure 2 with the cover thereof in a partially open position.

Figure 4 is a sectional view substantially as taken along the line IV—IV of Figure 3.

Figure 5 is a sectional view substantially as taken along the line V—V of Figure 4.

Figure 6 is a sectional view substantially as taken along the line VI—VI of Figure 4 with the cover in the closed position as indicated in Figure 2.

Figure 7 is a fragmentary view illustrating one manner of applying a switch-containing box to the exterior of the fan casing.

Figure 8 is a side view of the box structure shown in Figure 7.

Figure 9 is an oblique view of the peripheral part of the box structure with the end closures removed.

Figure 10 is a view generally similar to Figure 2 showing a modification of the device for adapting same to relatively thick walls, as in domestic dwellings.

In meeting the objects and purposes set forth above as well as others related thereto, I have provided a cylindrical collar having a radially disposed mounting flange encircling said collar, secured thereto and preferably spaced from the external end thereof. A cover is pivotally supported at its upper edge upon said mounting flange for movement from a position adjacent to and covering said external end of said collar to a position spaced from said collar. A locking mechanism, including a resilient means mounted on the lower end of said cover, a pull cord connected thereto and means for releasably engaging said pull cord, is provided for holding said cover positively in its closed position. A bracket is provided within said collar for supporting a conventional axial flow fan and motor. A disconnect switch is also mounted on the flange and is actuable by said cover for energizing or de-energizing said fan in cooperation with the opening or closing, respectively, of said cover.

For purposes of convenience in description, the terms "upper," "lower" and derivatives thereof will have reference to the device as appearing in Figures 1 and 2. The terms "inner," "outer" and derivatives thereof will have reference to the geometric center of said device. The terms "exterior" and "interior" will have reference to the leftward and rightward sides, respectively, of the device as appearing in Figure 2.

*Detailed description*

As shown particularly in Figures 1 and 2, the ventilator 10 has a cylindrical collar 11 which may be fabricated from any convenient, conventional material, such as sheet metal, and is provided with a mounting flange 12, which may also be fabricated from sheet metal. Said mounting flange is secured, as by a press fit, to said collar 11 and radially encircles same preferably at a short distance from the exterior end of said collar 11.

The collar 11 is slidably receivable through a suitable, usually rectangular, opening 13 in the side wall 14 of a trailer coach or similar structure. Said side wall 14 has an exterior panel 15 of durable and rigid construction, and an interior panel 16 which may be of either strong or frail construction, in the conventional and usual manner. Accordingly, when the mounting flange 12 which supports the collar 11 is secured, as by the screws 17, to the external surface of the exterior panel 15 substantially the entire ventilator 10 will be supported upon said exterior panel 15. In this particular embodiment, and as shown in Figure 1, the mounting flange 12 has a rectangular periphery. However, such may be varied as desired or required.

A motor mounting bar 18 is secured, as by bolting or welding, upon the interior end of the collar 11 and extends substantially diametrically thereacross. A conventional electric motor 19 may be supported upon said mounting bar 18 by means of the mount bolts 21 and conventional noise and vibration isolators 22. A conventional, axial flow fan 23 is supported upon the motor shaft 24 for rotation thereby adjacent the exterior end of said collar 11.

In order to fully encircle a conventional motor 19 and axial flow fan 23, the collar 11 will as a rule be of greater axial length than the thickness of the trailer coach wall 14. Some of this excess will be absorbed by the extension of the collar 11 exteriorly beyond the mounting flange 12, as appearing in Figure 2. However, the remainder of such excess will have to protrude through the opening 13 in the interior panel 16 into the interior of the coach. A grill member or closure member is provided with a grill portion 25, having an integral, axially extending flange or sleeve portion 26, is slidably receivable over the interior end of said collar 11. A supporting flange 27 is provided on said sleeve portion 26 remote from the grill portion 25 for securing said grill portion upon the interior panel 16 of said side wall 14. The sleeve portion 26 provides for variations in thicknesses of the different side walls 14 of different coaches. The grill portion 25 may be provided with openings therethrough in a substantially conventional manner.

An elongated, horizontally disposed cover hinge 28 is mounted upon the mounting flange 12 near the upper edge thereof, as shown in Figures 1 and 2. The cover hinge 28 has a roll 29, lengthwise of the lower edge thereof, which curves away from and then back toward said mounting flange 12 for engagement by a similar roll portion 31 on the upper edge of the ventilator cover 32. Said cover and the hinge roll 29 are assembled by sliding them endwise together. The cover 32, which is preferably rectangular, completely covers the exterior end of the collar 11 when in the closed position, as shown in Figure 1, and has a rim flange 33 along the outer edge of the cover. Said rim flange 33 extends from said cover 32 toward the mounting flange 12 and the cover roll 31 is preferably secured to the upper edge of said rim flange 33. A coil spring 53 or similar means is secured to flange 12, preferably near said hinge 28, and urges said cover 32 into the broken line position 36 in a conventional manner.

The switch 34 is preferably mounted within box structure 30 upon the collar 11 adjacent the top thereof and has a spring actuated switch plunger 35 of a conventional type engageable by said cover 32 as it moves from the broken line, open, position to the solid line, closed, position shown in Figure 2. The switch is closed when the plunger is extended, thereby effecting operation of the fan motor in a conventional manner.

The box structure 30 may be conveniently provided as shown in Figure 7 for reception into the space existing between the wall surface defining a rectangular opening in the trailer wall and the collar 11. The box is comprised of a sheet metal piece 61 and is provided with angle formations 62 and 63 at each end thereof for connection in any convenient manner, as by riveting or welding, to the peripheral surface of the collar 11. A flattened portion 64 is preferably provided at the corner of the box structure to allow for an opening 66 (Figure 8) through which the wire extends by which the fan is powered. Angles 67 and 68 are provided as convenient to receive and engage a closure flange 69. The switch 34 is mounted within said box on the outside of the collar 11 and is electrically connected in series with the motor windings in the usual manner.

As shown particularly in Figures 2, 3 and 4, a locking mechanism 37 is provided in the lower portion of the ventilator 10 and includes the bracket 38 mounted on the cover 32, the pull cord 39 and appropriate, axially aligned ports 41 and 42 in the lower ends of the mounting flanges 12 and 27, respectively.

The bracket 38 is preferably of strap material bent into a U-shaped form and provided with mounting flanges thereon. It provides an end wall 43 remote from the cover 32, said wall having a central opening 44 (Figure 4) through which the pull cord 39 may be slidably received. The bracket 38 is secured, as by riveting to said cover 32 so the axis of said opening 44 is substantially perpendicular to said cover and extends through said ports when said cover is in the closed position. A resilient means, such as the coil spring 45, preferably conical, is disposed within the bracket 38 so that its one end bears against the end wall 43. A bell-shaped member 46 is disposed within the coil spring 45 and its free edges are bent in any convenient manner around the other end of the coil spring 45, namely, that end adjacent to the cover 32. A cup-shaped or similar device may be used in place of the bell-shaped member 46. As shown in Figure 6, the pull cord 39 is secured at one end thereof to the bell-shaped member 46. Thus, by pulling on the cord 39, the bell-shaped member compresses the coil spring 45 against the end wall 43 until said bell-shaped member extends into and through the opening in said end wall 43.

The pull cord 39 may, as shown herein for illustrative purposes only, be comprised of a plurality of spherical, metallic beads 47 interconnected by small link rods 48 thereby giving flexibility and evenly spaced protuberances along said pull cord 39, for reasons appearing hereinafter. A grommet 49, either resilient or hard, is provided in and around the port 41 and has a beveled, central opening 51 of sufficient diameter to permit freedom of movement of the beads 47 of the pull cord 39 therethrough. When the cover 32 is in the closed position, the bracket 38 may rest against the grommet 49 and is cushioned thereby. As shown in Figures 4 and 5, the port 42 in the mounting flange 27 has a large portion of sufficient diameter to permit free movement of the beads 47 therethrough. Communicating with this large portion is the elongated, reduced portion 52 being slightly larger in width than the diameter of the link rods 48 for locking the pull cord 39 in position between two selected beads 47. It will be realized that the port 42 may be provided in means other than the mounting flange 27 of the grill 25 and is placed on said grill in this particular embodiment for convenience only.

Although not essential to all of the objectives of the invention, it is possible in the construction herein disclosed, and is preferable, to provide an extremely effective seal by applying a pad 71 of resilient material, as soft rubber, to the inside of the cover 32 (Figure 2). This will seat itself around the sharp outermost edge of the collar 11 and, being drawn snugly into place under the urging of the spring 45, an extremely tight and effective seal will be obtained.

There is further shown in Figure 2 an auxiliary flange 73 which fits over the cylindrical portion 26 of the inside grill and which may be made of any size required to cover the opening provided within the wall. In this manner, where the ventilator is used for relatively inexpensive building or trailer construction, so that a large opening is made in the wall, the opening may be satisfactorily covered without requiring modification or change in the rest of the ventilator structure.

Referring now to Figure 10, it will be seen that the ventilator herein disclosed can be readily modified for application to thick walls, as in houses, by the simple device of applying a telescoping supplementary collar 72 onto the collar 11 as shown. The inside grill 26 is then applied to the inward extremity of the supplementary collar 72 and the device is then capable of being mounted and operated in the same manner as above described for thin walls.

Operation

As shown particularly in Figure 2, the ventilator 10 is mounted upon the side wall 14 of a trailer coach or other mobile living space by providing an opening 13, preferably rectangular, through said wall and extending the collar 11 of said ventilator through said opening until the mounting flange 12 engages and is seated against the external panel 15 of said side wall. The mounting flange is then secured to said external panel 15 by screws or other suitable conventional means. The cover 32 will normally be mounted upon the hinge roll 29 of the hinge 28 when the ventilator unit 10 is received for installation. The grill 25 is sleeved upon the interior end of said collar 11, which normally extends through the side wall 14 into the inner living space of the trailer coach. The sleeve 26 on said grill 25 provides for variations in the amount by which said collar 11 extends into said living space, and flange 27 is secured to the interior panel 16. The grill 25 is so mounted that the port 42 in the lower edge thereof will be axially aligned with the port 41 in the mounting flange 12. The pull cord 39 is then threaded through the central opening 51 in the grommet 49 surrounding the port 41 and through the larger portion of the port 42 in the flange 27. The ventilator 10 is now ready for operation.

In operating said ventilator the pull cord 39 is moved from its position in the reduced portion 52 of said port 42 into the enlarged portion thereof whereby the cord 39 will be free to slide through both said port 42 and the port 41. The spring 53 secured to the flange 12 will then press the cover 32 away from said collar 11 into the broken line, open position 36 (Figure 2) while drawing the pull cord 39 through said ports. Such movement also releases the plunger 35 of the switch 34 thereby energizing the fan motor 19, in a conventional manner, and rotating the fan 23.

The ventilator 10 may be shut-off and closed simply by pulling the pull cord 39 inwardly through the ports 41 and 42 until the cover 32 first strikes the plunger 35, thereby deenergizing the fan motor 19, after which the cover then moves into the closed position shown in Figure 2. Due to variations in the thicknesses of the side wall 14 in any particular installation, a head 47 may be in the plane of the flange 27 when the cover 32 is snugly against the collar 11 and the pull cord is caught. Heretofore, it has been necessary to release the tension on the pull cord and let it pay out through the port 42 until a link rod 48 intersected the said plane of the flange 27. Then, and only then, the pull cord could be moved into the reduced portion 52 of said port 42 and thereby locked against further outward movement. However, the release of the pull cord to effect such locking thereof also permitted the spring 53 to move the cover 32 away from the collar 11 and destroy an otherwise tight closure. In conventional, residential installations a small amount of slack in the pull cord and the resultant gap between the cover 32 and collar 11 is inconsequential. In trailer coach installations, however, the cover must be tightly held against the exterior end of the collar 11 as any gap at all will permit undesirable leakage and perhaps cause damage.

If a bead 47 is in the said plate of the flange 27 in my improved construction, the pull cord 39 is pulled further interiorly, thereby causing the coil spring 45 to be depressed, until a link rod 48 can be moved into said reduced portion 52. Thus, by a single device and a simple movement the cover 32 is locked snugly against the exterior end of the collar 11 and the pull cord 39 is releasably but positively locked in position to prevent accidental release of the cover 32 from its closed position. It can easily be seen that the pull cord 39 will be released from the reduced portion 52 of the port 42 by a simple, sideward motion.

Thus, I have shown a device by which a ventilator may be mounted upon the exterior surface or panel of a trailer coach wall, in spite of any variation in thickness of said wall, with a neat interior appearance and a mechanism whereby said cover may be positively and firmly locked into position regardless of the thickness of the side wall and regardless of any slight variations in the construction of the ventilator 10.

Although I have described and disclosed a particular, preferred embodiment of my invention for carrying out the above mentioned purposes, it will be understood that modifications of such invention which lie within the scope thereof are fully contemplated unless specifically stated to the contrary in the appended claims.

I claim:

1. A device for supporting an axial flow fan upon a wall, said wall having an opening therethrough, and for weather sealing said opening when said fan is deenergized, the combination comprising: a collar mounted in said opening and means on said collar for coaxial support of said fan therewithin; said collar being of greater thickness than the thickness of said wall and having portions extending beyond the exterior and interior surfaces of said wall, said collar being of less cross-sectional area than said opening, the peripheral surface of said collar being spaced from the surface defining said opening; a mounting flange encircling said collar and frictionally gripping said collar near the outer end thereof, said mounting flange being of larger cross-sectional area than the cross-sectional area of said opening and overlying a portion of an exterior surface of said wall, means for securing said mounting flange to the exterior surface of said wall; a cover hinged along one edge upon said flange for movement from closed position within the plane defined by said end of said collar to open position spaced from said end, said cover extending radially beyond said collar when in closed position and having a rim integral with its outer edge and extending toward said flange; spring means urging said cover into said open position; said collar extending also inwardly from the interior surface of said wall and a closure member having a cylindrical portion telescopically engaging the inner end of said collar and a radially extending flange secured to said cylindrical portion member and engageable with the inner surface of said wall, said closure member having a grill secured to, and extending radially inwardly from, said cylindrical portion and covering the inner end of the opening defined by said collar; resilient means on said cover resistively movable toward said flanges along a line substantially parallel with the axis of said collar when said cover is in closed position; a pull cord secured at one end thereof to said resilient means for effecting said movement thereof; means fixed with respect to said collar along said line for releasably engaging said cord and holding said resilient means under strain, said cover being thereby held snugly against said collar.

2. The device described in claim 1 including also a plate having a central opening therein, said plate receiving said cylindrical portion of said closure member through said central opening and said plate lying against said radially extending flange, said plate being adapted for engaging the inner surface of the wall with which said ventilator is being used.

3. The device defined in claim 1 including also a band extending from the periphery of said collar outwardly to enclose a zone located radially outwardly of said collar, said zone being defined by the outer surface of said collar and the inner surface of said band, a control switch within said zone electrically connected in series with the motor of said fan, said switch having an actuating plunger thereon operable by said cover, said switch being normally open when said cover is in closed position and closed when said cover is in open position and means mounting said switch fixedly with respect to said collar.

4. The device defined in claim 1 including a further cylindrical member telescoping said collar and adapted for receiving said closure member at its end remote from said collar whereby said collar may be extended to adapt said apparatus for positioning within a wall of relatively great thickness.

5. A device for supporting an axial flow fan upon the exterior surface of, and within, an opening in a thin wall, the combination comprising: a collar, means for supporting said fan thereon, said collar being of greater thickness than the thickness of said wall, portions of said collar extending beyond the exterior and interior surfaces of said wall, said collar being of less cross-sectional area than said opening, the peripheral surface of said collar being spaced from the surface defining said opening; a mounting flange encircling said collar and secured thereto near the outer end thereof, means securing said mounting flange to said exterior surface of said wall, said mounting flange constituting the primary means to support said collar and said fan on said wall; a closure member having a cylindrical portion snugly and telescopingly engaging the inner end of said collar; a supporting flange secured to, and extending radially outwardly from said cylindrical portion; said closure member having a grill secured to, and extending radially inwardly from, said cylindrical portion and covering the inner end of the opening defined by said collar; and means securing said supporting flange to the interior surface of said wall.

6. The device of claim 5 including a cover, said cover including a planar portion adapted to close the other end of the opening defined by said collar, said cover having an inwardly directed flange spaced from and surrounding that portion of the collar which extends beyond the exterior surface of said wall, said flange of said cover adapted to contact said mounting flange when in its closed position, means to hingedly connect said cover flange along one of its edges to said mounting flange.

7. The combination of claim 6 including a bracket secured to said cover below that portion thereof which closes said other end of said opening; a first port in said mounting flange axially aligned with said bracket when said cover closes said other end; a second port in said supporting flange axially aligned with said first port; a pull cord resiliently mounted on said bracket and passing through said ports; means on said cord selectively interengageable with said second port to snugly hold said cover against said collar to close said other end of said opening.

8. The structure of claim 7 in which: said bracket is a U-shaped strap having its web with an opening therethrough, and its free ends being secured to said cover; said resilient mounting for said cord including a coil spring disposed between said cover and said web and a bell-shaped member disposed within said spring, the rim of said member engaging that end of said spring adjacent said cover and the central part of said member being secured to said cord.

9. A device for supporting an axial flow fan upon the exterior surface of, and within, an opening in a thin wall, the combination comprising: a collar, means for supporting said fan thereon, said collar being of greater thickness than the thickness of said wall, portions of said collar extending beyond the exterior and interior surfaces of said wall, said collar being of less cross-sectional area than said opening, the peripheral surface of said collar being spaced from the surface defining said opening; a mounting flange encircling said collar and secured thereto near the outer end thereof, means securing said mounting flange to said exterior surface of said wall, said mounting flange constituting the primary means to support said collar and said fan on said wall; a grill member having a sleeve portion telescopingly fitting over the inner end of said collar, a supporting flange secured to, and extending radially outwardly from, said sleeve portion, and a grill portion extending radially inwardly from said sleeve portion over the inner end of the opening defined by said collar; and means securing said supporting flange to the interior surface of said wall.

10. A device for supporting an axial flow fan upon the exterior surface of, and within, an opening in a thin wall, the combination comprising: a collar, means for supporting said fan thereon, said collar being of greater thickness than the thickness of said wall, portions of said collar extending beyond the exterior and interior surfaces of said wall, said collar being of less cross-sectional area than said opening, the peripheral surface of said collar being spaced from the surface defining said opening; a mounting flange encircling said collar and secured thereto near the outer end thereof, means securing said mounting flange to said exterior surface of said wall, said mounting flange constituting the primary means to support said collar and said fan on said wall; a closure member having an axially flanged portion telescopingly engaging the inner end of said collar, a supporting flange secured to, and extending radially outwardly from, said axially flanged portion; a grill portion secured to, and extending radially inwardly from, said portion and covering the inner end of the collar opening; and means securing said supporting flange to the interior surface of said wall.

References Cited in the file of this patent

UNITED STATES PATENTS

| 1,792,514 | Spear | Feb. 17, 1931 |
| 2,084,807 | Hueglin | June 22, 1937 |
| 2,225,349 | Morse | Dec. 17, 1940 |
| 2,355,836 | Willey | Aug. 15, 1944 |
| 2,483,547 | Koch | Oct. 4, 1949 |
| 2,580,797 | Koch | Jan. 1, 1952 |
| 2,638,836 | Hull | May 19, 1953 |